United States Patent [19]

Wupper

[11] Patent Number: 4,753,491
[45] Date of Patent: Jun. 28, 1988

[54] ANTI-LOCK HYDRAULIC BRAKE SYSTEM WITH PLUNGER SYSTEM AND PUMP

[75] Inventor: Hans Wupper, Friedrichsdorf, Fed. Rep. of Germany

[73] Assignee: Alfred Teves GmbH, Frankfurt am Main, Fed. Rep. of Germany

[21] Appl. No.: 8,601

[22] Filed: Jan. 28, 1987

[30] Foreign Application Priority Data

Jan. 28, 1986 [DE] Fed. Rep. of Germany ....... 3602430

[51] Int. Cl.⁴ .......................... B60T 8/32; B60T 8/40; B60T 8/42
[52] U.S. Cl. ................................. 303/115; 303/116; 303/119
[58] Field of Search ............ 303/116, 115, 119, 10–12, 303/68–69, 61–63, 100, 22, 113, 117, 114; 188/181 A, 181 R, 195; 60/591

[56] References Cited

U.S. PATENT DOCUMENTS

| Re. 28,890 | 7/1976 | Ingram et al. | 303/115 X |
|---|---|---|---|
| 3,597,012 | 8/1971 | Packer et al. | 303/115 |
| 3,610,702 | 10/1971 | MacDuff | 303/115 |
| 3,640,589 | 2/1972 | Taniguchi | 303/115 X |
| 3,667,816 | 6/1972 | Harned | 303/119 |
| 3,677,608 | 7/1972 | Lewis | 303/115 |
| 3,726,568 | 4/1973 | Krugler, Jr. | 303/115 |
| 3,756,664 | 9/1973 | Schlitz et al. | 303/115 |
| 3,774,976 | 11/1973 | Parsons | 303/115 |
| 3,788,710 | 1/1974 | Von Grunberg et al. | 303/115 |
| 3,871,717 | 3/1975 | Jensen | 303/115 X |
| 3,927,914 | 12/1975 | Fink et al. | 303/115 |
| 3,975,061 | 8/1976 | Kondo et al. | 303/21 AF |
| 3,994,538 | 11/1976 | Farr | 303/115 |
| 4,017,126 | 4/1977 | Ohta | 303/115 |
| 4,066,301 | 1/1978 | Harries | 303/115 |
| 4,555,145 | 11/1985 | Maehara et al. | 303/116 X |
| 4,580,848 | 4/1986 | Widmer | 303/116 |

FOREIGN PATENT DOCUMENTS

| 2212912 | 9/1973 | Fed. Rep. of Germany . |
|---|---|---|
| 2311408 | 9/1974 | Fed. Rep. of Germany . |
| 2415701 | 11/1974 | Fed. Rep. of Germany . |
| 2603195 | 8/1976 | Fed. Rep. of Germany . |
| 2638190 | 3/1978 | Fed. Rep. of Germany . |
| 2908482 | 10/1980 | Fed. Rep. of Germany . |
| 2918772 | 11/1980 | Fed. Rep. of Germany . |
| 3133283 | 3/1983 | Fed. Rep. of Germany . |
| 1259404 | 1/1972 | United Kingdom . |
| 1421703 | 1/1976 | United Kingdom . |
| 2047366 | 11/1980 | United Kingdom . |
| 2054613 | 2/1981 | United Kingdom . |
| 2073348 | 10/1981 | United Kingdom . |
| 2141194 | 12/1984 | United Kingdom . |

*Primary Examiner*—Douglas C. Butler
*Attorney, Agent, or Firm*—James B. Raden; Robert P. Seitter

[57] ABSTRACT

An anti-lock hydraulic brake system equipped with one plunger system (7, 8) each per brake circuit (I, II) for the purpose of pressure control, that is, slip control. Serving as an auxiliary-pressure source is a hydraulic pump (9) which is driven electromotively, preferably through the starter motor (10), and which comprises hydraulically isolated circuits for the individual plunger systems. The plunger systems are each controlled by one two-way/two-position directional control valve (21, 22) which is actuatable electromagnetically and is controllable as a function of the signals obtained by wheel sensors (24 to 27) and processed in an electronic controller (23). A valve piston (47, 48) in conjunction with a valve member (55, 56) and a channel (53, 54) closable by this valve member opens in the plunger system (7, 8) a connection to a pressure-fluid return line (19, 20) as soon as the braking pressure has decreased to a predetermined low threshold value and thereby prevents low pressure in the brake system. The hydraulic pump (9) is in operation only during the control. A strong resetting spring (45, 46) ensures that the normal brake function will be regained immediately on failure of the auxiliary pressure.

8 Claims, 1 Drawing Sheet

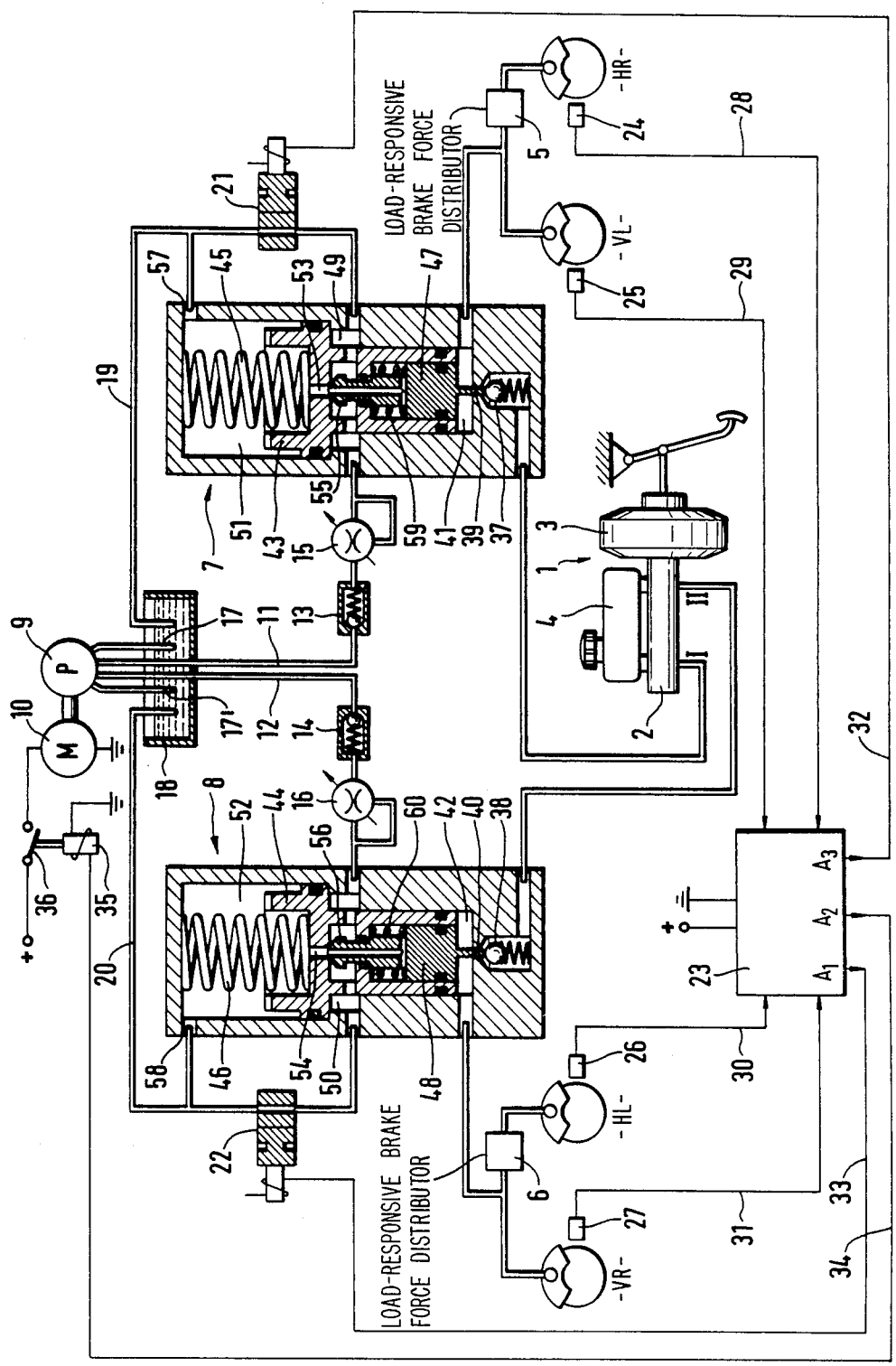

ANTI-LOCK HYDRAULIC BRAKE SYSTEM WITH PLUNGER SYSTEM AND PUMP

BACKGROUND OF THE INVENTION

The present invention relates to an anti-lock hydraulic brake system comprising a pedal-actuator braking pressure generator, including a braking pressure modulator comprising plunger systems which are inserted into the prssure fluid conduits leading from the braking pressure generator to the wheel brakes, an auxiliary-pressure supply system and of electromagnetically actuatable multidirectional control valves for the control of the plunger systems. The system further comprises wheel sensors and electronic circuits which serve to generate electric signals by logical combining and signal processing for the purpose of control of the multidirectional control valves as a function of the wheel rotational behavior and additional criteria.

Such a brake system is known from German published patent application No. 29 08 482. In this case, the braking pressure modulator also comprises in each controlled brake circuit a plunger system which is inserted into the pressure fluid conduit leading from the pedal-actuated braking pressure generator to the wheel brake. The auxiliary-pressure supply system required for the actuation of the plunger pistons comprises a hydraulic pump and a pressure fluid reservoir according to this German published application. The plunger system is composed of a control piston and a reaction piston. Prior to the commencement of control, the control piston is maintained by the auxiliary pressure in its end position in which the valve ball of a non-return valve at the head of the control piston is likewise maintained in its opened position by a tappet secured to the housing, and thereby releases the pressure fluid conduit from the braking pressure generator to the wheel brake. Upon the occurrence of a signal indicative of an imminent locked condition, the pressure chamber on the one side of the control piston will be connected by way of an electrically actuatable valve with the return line wherein displacment of the control piston and closure of the non-return valve results. By the action of the reaction piston and by deviation of the auxiliary-pressure medium, a chamber which is disposed at the frontal end of the control piston and is closed in this phase by the non-return valve will be enlarged, giving rise to a pressure decrease in the wheel brake.

This known plunger system is relatively complicated in that it requires at least two additional solenoid valves per control circuit and, moreover, a pressure accumulator because the auxiliary pressure must be available at all times. On failure of the auxiliary pressure source, normal braking continues to be possible, however, with an increased pressure fluid volume and a larger pedal travel. Similar circumstances apply for other known plunger systems inasmuch as they either require relatively complicated valve assemblies and/or complicated control elements and control valves.

It is the general object of the present invention to develop an anti-lock system which can be manufactured at minimum cost. Special importance is attached to the unrestricted operability of the brake system on failure or impairment of the energy supply or in the event of any other disturbance appearing prior to or during braking with slip control, while only the failure of the control, but not an impairment of the brake characteristics, is tolerated.

SUMMARY OF THE INVENTION

This object is achieved in an unexpectedly simple manner by a brake system of the type initially referred to and equipped with plunger systems, the special features of the system residing in that in each brake circuit a plunger system is provided which comprises a stepped plunger piston applied by the braking pressure. On braking operations without slip control the plunger piston is kept in its initial position by the force of a resetting spring opposed to the braking pressure and which is displaceable in opposition to the force of the resetting spring by the introduction of auxiliary pressure which is applied in an annular chamber within the plunger system to an annular surface of the plunger piston brought about by the step. A non-return valve which is kept open in the initial position of the plunger piston closes, thereby shuts off the pressure fluid conduit from the braking pressure generator to the plunger pistons and causes enlargement of the frontal chamber which is confined by the pressurized plunger piston surface and hence brings about braking pressure reduction in one or all of the wheel brakes connected.

The plunger systems used according to the present invention are of comparatively simple design and for this reason are susceptible to disturbances only to a small extent. The use of a strong spring which keeps the plunger piston that is exposed directly to the braking pressure in its initial position even in the presence of high braking pressures, or (if the defect occurs during braking with slip control) returns the plunger piston to its initial position guarantees with great reliability that the brake function (without slip control) is preserved under all circumstances. It is further of significance that for each plunger system only one two-way/two-position directional control valve is required for the modulation of the pressure in response to the sensor signals. What is more, the auxiliary pressure is needed only during the control period.

According to a favorable embodiment of the present invention, the plunger piston contains a valve piston which, in the presence of a braking pressure (of, for example, 1 bar) that is in excess of a low threshold value predefined by a second resetting spring, closes a channel providing communication between the annular chamber in the interior of the plunger system and a return line and the compensating reservoir of the auxiliary-pressure supply system. It will be accomplished thereby that, for instance, in the event of a wheel-lock signal being applied relatively long, the plunger is not returned to its end position, but is moved back only so far as is required for the pressure reduction in the wheel brake connected. This avoids the occurrence of a low pressure in the brake system which would cause retraction of the brake-caliper pistons. This is because as soon as the pressure has decreased to the low threshold value predetermined by the second resetting spring, the channel and thus the conduit to the pressure-compensating reservoir will be opened, and further displacement of the plunger piston is thereby precluded.

According to another embodiment of this invention, the auxiliary-pressure supply system comprises an electromotively driven multiple-circuit hydraulic pump, to which the individual plunger systems are connected by way of separate pressure-fluid circuits. This permits an individual pressure control by means of the individual plunger systems.

Expediently, throttling devices are inserted into the pressure fluid conduits from the hydraulic pump to the associated plunger systems, the throttling cross-sections of which are variable as a function of the braking pressure or on a pressure proportional thereto, for example, on the pressure in the plunger annular chamber.

To drive the hydraulic pump, the starter electric motor which is available in automotive vehicles can be used, while engagement of the starter pinion during pressure control can be prevented with the aid of a special electric control. This contributes also to reducing the manufacturing expenditure. Disadvantages are not involved therewith because starter and auxiliary pressure are never required at the same point of time.

Still another embodiment of the instant invention provides for the drive motor of the hydraulic pump to be switched on upon the occurrence of an imminent locked condition or the suspicion of an imminent locked condition, that means in the presence of a wheel rotational behavior indicative of a risk of wheel lock, upon occurrence of a critical braking pressure variation or any other criterion signalling the danger of wheel lock.

The annular chamber in the plunger system is in communication with the return line and with the pressure-compensating reservoir of the auxiliary-pressure supply system by way of electromagnetically actuatable two-way/two-position directional control valve which is opened in its initial position, that means when de-energized, and which closes the passage after it is changed over.

An embodiment of this invention which is particularly favorable in terms of cost resides in that it is designed as a dual-circuit brake system with diagonally connected vehicle wheels and comprises two plunger systems with one two-way/two-position directional control valve each and with one joint dual-circuit hydraulic pump driven by the starter motor and comprising pressure-responsively variable throttling devices.

BRIEF DESCRIPTION OF THE DRAWING

Further features, advantages and possibilities of application can be gathered from the following description of an embodiment with reference to the accompanying drawing wherein the single FIGURE is a schematically simplified view which illustrates the essential hydraulic and electric components of a brake system of the inventive type.

The embodiment of the present invention illustrated in the drawing concerns a hydraulic brake system with diagonal brake circuit split-up. Serving as a braking pressure generator 1 is a unit which herein is composed of a tandem master cylinder 2 with a brake power booster 3 connected upstream thereof. The associated pressure-compensating and supply reservoir is assigned the reference numeral 4. The left front wheel VL and the right rear wheel HR are connected to the brake circuit I, while the other two wheels VR and HL are connected to the brake circuit II. To adapt the brake force distribution to the axle load and axle load distribution which is variable in dependence on static and dynamic vehicle values, load-responsive brake force distributors 5, 6 are inserted into the pressure fluid conduits leading to the rear wheels HR, HL.

For the purpose of brake force control which, in every situation, is to prevent locking of the wheels, one plunger system 7, 8 each is inserted into the pressure fluid conduit of the two brake circuits I, II. As an auxiliary-pressure source which supplies the pressure, that is the energy, for the decrease of the braking pressure during a slip control period, there is provision of a dual-circuit hydraulic pump 9 which is driven by means of an electric motor 10. In the embodiment described, the starter electric motor simultaneously serves to drive the pump 9.

In the two hydraulically isolated circuits 11, 12 of the pump 9, that means in the pressure fluid conduits connecting the pressure side of the pump 9 with the plunger systems 7, 8, there are inserted each one non-return valve 13, 14 and a throttle 15, 16 whose throttling effect is variable as a function of the magnitude of the auxiliary pressure at the connection of the respective plunger system 7, 8. The suction side 17, 17' of the pump 9 is connected to a pressure-fluid supply reservoir 18, into which likewise pressure-fluid return lines 19, 20 are terminating which return pressure fluid from the plunger system 7, 8. The reservoir 18 lends itself to being combined with the compensating reservoir 4 of the tandem master cylinder 2 to form a construction unit.

To control the plunger systems 7, 8, there is provided of each one multidirectional control valve 21, 22, namely an electromagnetically actuatable two-way/two-position directional control valve which is opened in its inactive position and which can be switched over to close.

The signals for the change-over of the multi-directional control valves 21, 22 are generated with the aid of a controller 23, into which the information about the rotational behavior of the individual wheel obtained by means of wheel sensors 24 to 27 is fed by way of electric signal lines 28 to 31. Said controller 23 contains electronic circuits, namely hard-wired or programmed logic circuits and signal-processing circuits which serve to obtain the signals for the control of the multidirectional control valves 21 and 22 and thus for the pressure modulation and slip control. By way of the outputs $A_1$, $A_3$ and by way of the signal lines 32, 33, the electric control signals are supplied to the valves 21, 22. A third signal line 34 (output $A_2$) leads to a relay 35 which switches on the starter motor 10 by way of a related contact 36 as soon as auxiliary pressure is needed. The control circuity for the electric motor 10 is designed such that on actuation of this motor 10 by way of the relay 35, the starter pinion will not become engaged.

The two plunger systems 7, 8 have the same design. All components are illustrated in their inactive position. Through a non-return valve 37, 38 which is kept open by a tappet 39, 40, there is a direct hydraulic connection in this inactive position between the brake circuits I and, respectively, II of the tandem master cylinder 2 and the wheels and wheel brakes, respectively, of one diagonal each. The pressure fluid conduit leads in each case by way of a non-return valve 37 and 38, respectively, and one chamber 41 and 42, respectively, in the interior of the plunger system.

The plunger systems 7, 8 contain as essential components each one stepped plunger piston 43, 44 which is maintained in its inactive position, that is its end position illustrated, by a strong resetting spring 45, 46, a valve piston 47, 48 as well as an annular chamber 49, 50 which communicates by way of the throttle 15, 16 and by way of non-return valve 13, 14 with the auxiliary-pressure source, namely the hydraulic pump 9, as well as finally a channel 53, 54 leading from the annular chamber 49, 50 to a chamber 51, 52 at the back side of the plunger piston 43, 44, the said channel being closable by a valve member 55, 56 actuatable by the valve piston 47, 48. This chamber 51, 52 is by way of a connecting line 57, 58 in permanent communication with the pressure-fluid return lines 19, 20 and thus with the reservoir 18.

The resetting spring 45, 46 is dimensioned such that it will keep the plunger piston 43, 44 in the end position illustrated even in the presence of high braking pressure, as long as control does not commence. On the other hand, a second resetting spring 59, 60 which displaces the valve piston 47, 48 in relation to the plunger piston 43, 44 has very little resetting force, to the end that already a low braking pressure of e.g. 1 bar suffices to cause displacement of the valve piston and thereby closure of the channel 53, 54.

The brake system illustrated operates as follows: As long as each wheel runs stably, the plunger systems 7, 8 do not have any influence on the braking action. The plunger piston 43, 44 remains in the end position illustrated even in the presence of high braking pressure and thus high pressure in the frontal chamber 41, 42. Solely the valve piston 47, 48 will be displaced already when a very low pressure threshold is exceeded so far that it closes the channel 53, 54.

When now a situation occurs which might endanger the driving stability of a wheel, the starter motor 10 and thus the hydraulic pump 9 will be switched on. As long as the multidirectional control valve 21, 22 continues to be open, no pressure build-up may take place in the annular chamber 49, 50 though. Only on detection of an actual imminent locked condition (all information is derived from the wheel rotational behavior, that is the corresponding wheel--sensor measured values, as mentioned) will take the valve 21 or 22 of that circuit in which wheel lock is imminent be switched to close so that now the pressure in the annular chamber 49, 50 is allowed to rise and to finally displace the plunger piston 43, 44 in opposition to the force of the resetting spring 45, 46. As a result, the non-return valve 37, 38 is closed and the braking pressure generator 2 is hydraulically isolated from the wheel brakes, further braking pressure rise being precluded thereby. Continued displacement of the plunger piston 43, 44 under the action of the auxiliary pressure in the annular chamber 49, 50 leads to an enlargement of the frontal chamber 41, 42 which continues to be in hydraulic communication with the wheel brakes and thus leads to a reduction of the braking pressure. After the re-acceleration of the wheel or the attainment of a specific predetermined wheel rotational behavior, the valve 21, 22 serves to decrease the pressure in the annular chamber 49, 50 until it attains the predetermined value again or even until attainment of the complete pressure balance.

However, even with the lock signal continuing to be applied and on continued delivery of pressure fluid into the annular chamber 49, 50, the valve piston 47, 48 with the valve member 55, 56 will continue to displace the plunger piston 43, 44 in opposition to the resetting spring 45, 46 only for as long as until the braking pressure in the wheel brakes and thus in the frontal chamber 41, 42 has decreased to a specific, very low value. As soon as this value is attained, the spring 59, 60 will reset the valve piston 47, 48. This opens the channel 53, 54 and thus a pressure fluid conduit through the return line 19, 20 to the reservoir 18. By this fashion, the valve piston prevents that the plunger piston 43, 44 moves back too far and hence avoids the development of low pressure in the chamber 41, 42 and in the wheel brakes connected, what would have as a result undesired retraction of the brake caliper pistons.

The throttle 15, 16 in the pressure fluid conduit from the pump 9 to the plunger annular chamber 49, 50 varies its throttling cross-section proportionally to the pressure in the plunger annular chamber 49, 50, what achieves an adaptation of the pressure decrease rate to the volume absorption characteristic of the brake system.

Despite the very simple design of the pressure modulator, in particular of the plunger systems which can be controlled each by only one single two-way/two-position directional control valve, it is ensured with great reliability to maintain or regain the normal brake function in the event of auxiliary-pressure failure or any other disturbance because, owing to the strong resetting spring 45, 46, the plunger piston 43, 44 will be returned to its end position at once or, respectively, kept in its end position and provides communication between the master cylinder 2 and the wheel brakes by way of the tappet 39, 40.

In spite of a small total expenditure, an auxiliary source of high energy is at disposal by using the starter electric motor to drive the hydraulic pump. The additional load on the automotive vehicle's starter battery ensuing is of no importance in practical operation because the slip control periods are comparatively very short and because this higher load occurs substantially only during the period of pressure decrease in the course of slip control.

In the embodiment of the invention described, each wheel is equipped with a sensor for measuring the wheel rotation behavior. To simplify the control and to reduce the manufacturing expenditure, it is however possible to furnish only three wheels or even only the front wheels with sensors. In the last-mentioned instance, sufficient anti-lock protection is safeguarded by exclusively monitoring the rotational behavior of the front wheels, the brake adjustment being intact which insures that the front wheels become unstable or lock always before the rear wheels. When the brake adjustment is intact, locking of a rear wheel is acceptable in specific driving situations and road conditions such as cornering, differing frictional values on the right and left road side etc., because with this brake dimensioning a rear wheel may lock only under rare, particularly unfavorable conditions. The use of another sensor, that is at least three sensors, ensures that in all situations steerability and a certain driving stability are preserved during panic stops.

What is claimed is:

1. An anti-lock hydraulic brake system for use with automotive vehicles comprising a pedal-actuated braking pressure generator (1) including a braking pressure modulator, comprising a plunger system (7, 8) which is inserted into the pressure fluid conduits leading from the braking pressure generator to the wheel brakes, an auxiliary-pressure supply system and electromagnetically actuatable multidirectional control valves for the control of the plunger systems, further comprising wheel sensors and electronic circuits which serve to generate electric signals by logical combining and signal processing for the purpose of control of the multidirectional control valves as a function of the wheel rotational behavior and additional criteria, wherein in each brake circuit (I, II) one said plunger system (7, 8) is provided which comprises a stepped plunger piston (43, 44) applied by the braking pressure, which plunger piston on braking operations without slip control is kept in its initial position by the force of a first resetting spring (45, 46) opposed to the braking pressure and wherein each plunger system (7, 8) includes a valve piston (48) slidably mounted within said stepped plunger piston (43, 44) and wherein one end of said valve piston (48) includes a valve member (56) which closes a channel (54) which extends from a valve seat surface facing said valve member (56), through said valve piston and into a chamber (52) which surrounds said resetting spring (45, 46), said valve member (56) closing a transverse passage through said stepped plunger piston (43, 44) and through an annular chamber (49, 50) in said plunger piston (43, 44), said passage being connected at one end thereof to said auxiliary-pressure supply system by way of a first conduit (11, 12) and being connected at the other end thereof to an unpressurized supply reservoir (18) by way of a second conduit (19, 20), said valve piston (48) terminating in a frontal chamber (41, 42) at its other end thereof, said frontal chamber (41, 42) communicating with the braking pressure generator (1) by way of a non-return valve (37, 38) that is kept open in the initial position of the plunger piston (43, 44) by an extension of said valve piston (48) which engages said non-return valve (37, 38) an electromagnetically actuated normally open valve (21, 22) connected in said second conduit (20) between said other end of said passage and said unpressurized reservoir (18), and wherein said plunger piston (43, 44) is displaceable in opposition to the force of the resetting spring (45, 46) by the introduction of auxiliary pressure which is applied in said annular chamber (49, 50) within the plunger system (7, 8) to an annular surface of the plunger piston (43, 44) caused by the step, while said non-return valve (37, 38) that is kept open in the initial position of the plunger piston (43, 44) closes, which thereby shuts off the pressure fluid conduit from the braking pressure generator (1) to the plunger piston (43, 44) and causes enlargement of the frontal chamber (41, 42) which is confined by the pressurized plunger piston surface and thereby brings about braking pressure reduction in at least one of the wheel brakes connected.

2. A brake system as claimed in claim 1, wherein incorporated in the plunger piston (43, 44) is a valve piston (47, 48) which, in the presence of a braking pressure that is in excess of a low threshold value predefined by a second resetting spring (59, 60), closes a channel (53, 54) providing communication between the annular chamber (49, 50) in the interior of the plunger system (7, 8) and said second conduit or pressure-fluid return line (19, 20) and said reservoir (18) of the auxiliary-pressure supply system, respectively.

3. A brake system as claimed in claim 2, wherein the auxiliary-pressure supply system comprises an electromotively driven multiple-circuit hydraulic pump (9), to which the individual plunger systems (7, 8) are connected by way of separate pressure fluid circuits.

4. A brake system as claimed in claim 3, wherein throttling devices (15, 16) are inserted into the pressure fluid conduits (11, 12) from the hydraulic pump (9) to the associated plunger systems (7, 8), the throttling cross-sections of which are variable as a function of the braking pressure.

5. A brake system as claimed in claim 4, the starter electric motor (10) of the automotive vehicle is used to drive the hydraulic pump (9), while engagement of the starter pinion during pressure control is prevented with the aid of an electric control.

6. A brake system as claimed in claim 5, wherein the drive motor (10) of the hydraulic pump (9) is switched on upon the occurrence of an imminent locked condition or a wheel rotational behavior indicative of a tendency to wheel lock, a critical braking pressure variation criterion signalling the anger of wheel lock.

7. A brake system as claimed in claim 6, wherein the annular chamber (49, 50) in the plunger system (7, 8) is in communication with the second conduit or return line (19, 20) and with the unpressurized supply reservoir or pressure compensating reservoir (18) of the auxiliary-pressure supply system by way of said electromagnetically actuated normally open valve (21, 22) of the two-way/two-position directional control valve type which is opened in the initial position when de-energized, and which closes the fluid passage after is is changed over.

8. A brake system as claimed in claim 7, wherein the brake system is provided as a dual-circuit brake system with diagonally connected vehicle wheels (VL, HR, VR, HL) and includes one said plunger system (7, 8) in each circuit and with one said two-way/two-position directional control valve (21, 22) in each circuit and with one joint dual-circuit hydraulic (9) driven by the starter motor (10), with the pressure-responsively variable throttling devices or throttles (15, 16) being respectively inserted into the pressure fluid conduits leading to the plunger system (7, 8) in each circuit of said dual-circuit brake system.

* * * * *